Figure 1:
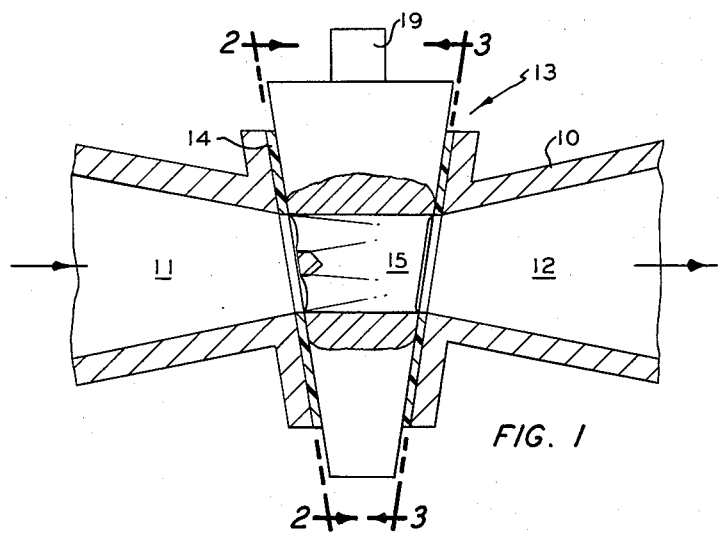

July 17, 1962 R. O. WELTY ET AL 3,044,493

VALVE MEANS

Filed Dec. 2, 1960 2 Sheets-Sheet 1

INVENTORS
R.O. WELTY
E.E. RUSH

BY Hudson Young
ATTORNEYS

United States Patent Office 3,044,493
Patented July 17, 1962

3,044,493
VALVE MEANS
Richard O. Welty and Elton E. Rush, Bartlesville, Okla., assignors to Phillips Petroleum Company, a corporation of Delaware
Filed Dec. 2, 1960, Ser. No. 73,255
1 Claim. (Cl. 137—625.32)

This invention relates to an improved valve. In one aspect, it relates to an improved tapered plug valve. In another aspect, this invention relates to a non-lubricated valve. In still another aspect, this invention relates to a fast-acting, non-lubricated plug valve for a product take-off system. In a further aspect, this invention relates to a tapered plug valve equipped with a resilient liner, the valve being particularly characterized by its ability to effectively prevent cold flow and/or rupture of the resilient liner. In a still further aspect, this invention relates to a plug valve having an enlarged upstream port so that the pressure drop occurs primarily at the downstream port. In another aspect, this invention relates to a plug valve having a divided upstream port characterized by greater mechanical strength. In a still further aspect, this invention relates to a plug valve having a resilient liner, the valve being characterized by a divided upstream port to provide greater mechanical support for the liner. In a yet further aspect, the invention relates to a valve characterized by its ability to shut off the downstream port before shutting off the upstream port.

In many processes which require a fast-acting valve, lubrication of the valve would be undesirable due to the possibility of contamination of the process stream. It therefore is desirable to use plastic seated valves in order to obtain tight sealing. One example of such a process is in the reactor take-off system of a process for the polymerization of olefins directly to the solid state, i.e., in the absence of a good solvent therefor. In previous operations, different types of plastic-seated ball valves and tapered plug valves were utilized in this service. However, the ball valves have failed because of cold flow of the upstream Teflon seat which ultimately prevents the valve from sealing. The tapered plug valves have failed due to the tearing out of a part of the Teflon liner around the upstream port. The usual Teflon-lined tapered plug valves have symmetrical upstream and downstream ports. When the valve is partially open the pressure drop through the valve causes forces to act on the unsupported portion of the liner around the upstream port in such a manner as to cause cold flow of the Teflon and ultimate failure.

It has been found that these difficulties can be overcome by enlarging the upstream port in the valve plug so that the pressure drop is taken primarily by the downstream port, and/or by dividing the upstream port into two or more openings so that a web exists to provide mechanical support for the liner.

Accordingly, it is an object of this invention to provide an improved valve. Another object of this invention is to provide an improved valve characterized by its reliable operation and manipulation. Still another object of this invention is to provide an improved valve characterized by the longer life of the liner. A further object of this invention is to reduce or eliminate the cold flow of the resilient liner in a plug valve. Yet another object of this invention is to prevent failure of the liner in a plug valve.

Other aspects, objects, and the several advantages of the invention will be apparent from a study of the disclosure, the drawing, and the appended claim.

According to the invention, there is provided a valve structure comprising, in combination, a valve housing defining a valve chamber, inlet and outlet means communicating with said chamber, a liner means in intimate contact with said valve chamber, a valve element rotatably mounted in said valve chamber in engagement with said liner means, said valve element having a passage therethrough, defined by an inlet port and an outlet port, in communication with said inlet means and said outlet means, and said inlet port having a greater width than said outlet port.

Further, according to the invention, there is provided a valve structure comprising, in combination, a valve housing defining a valve chamber, inlet and outlet means communicating with said chamber, a liner means in intimate contact with said valve chamber, a valve element rotatably mounted in said valve chamber in engagement with said liner means, said valve element having a passage therethrough, defined by an inlet port and an outlet port, in communication with said inlet means and said outlet means, and said inlet port comprising at least two openings.

Still further, according to the invention, there is provided a valve structure comprising, in combination, a valve housing defining a valve chamber, inlet means and outlet means communicating with said chamber, a lining means in intimate contact with said valve chamber, a valve element rotatably mounted in said valve chamber in engagement with said lining means, said valve element having a passage therethrough defined by an inlet port and an outlet port, in communication with said inlet means and said outlet means, said inlet port having a greater width than said outlet port, and said inlet port comprising at least two openings.

Figures 2, 3, 4:
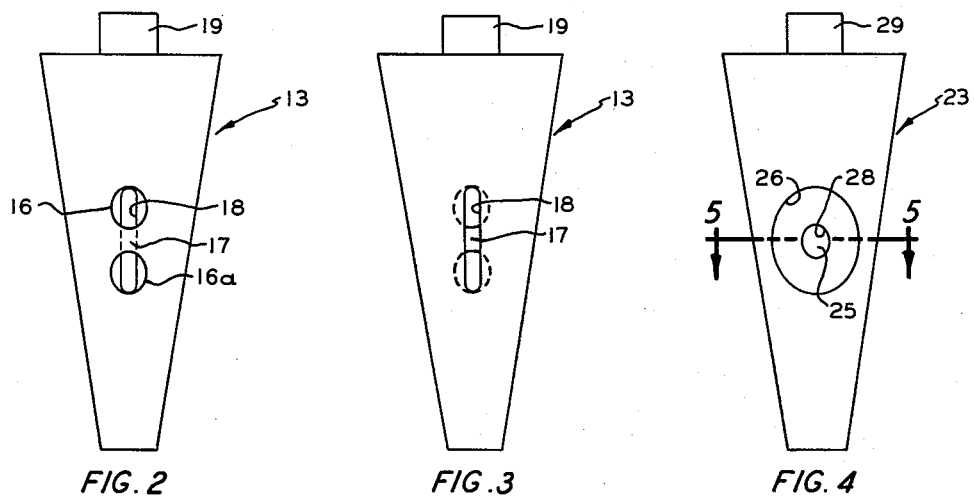
Figure 5:
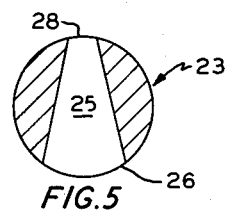
Figure 6:
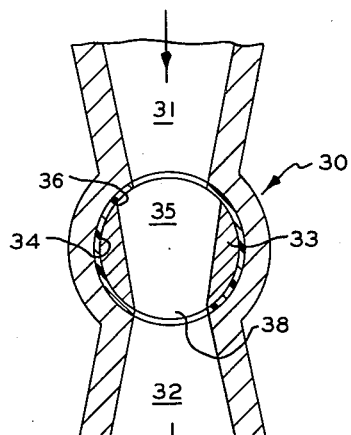
Figure 7:
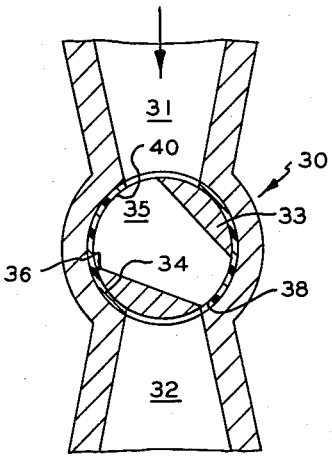
Figure 8:
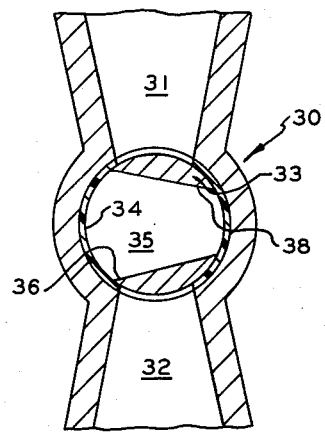

In the drawings, FIGURE 1 is an elevation view in section of an improved valve of this invention. FIGURE 2 is an elevation view of the valve plug of FIGURE 1 taken generally along line 2—2. FIGURE 3 is an elevation view of the valve plug of FIGURE 1 taken generally along line 3—3. FIGURE 4 is an elevation view of another valve plug according to this invention. FIGURE 5 is a cross-sectional view of the valve plug of FIGURE 4 taken along line 5—5. FIGURES 6, 7, and 8 are plan views in section of an improved valve according to this invention.

Referring now to the drawing, FIGURE 1 shows a valve 10 having inlet conduit 11, outlet conduit 12, valve element or valve plug 13, and resilient liner 14. The liner 14 is formed preferably of Teflon, although other plastic materials with low friction characteristics and which are not materially affected by the flowing media can be used, e.g., polyolefins such as polyethylene, polypropylene, etc., polyvinylchloride, nylon, and other suitable materials known to the art. The resilient liner 14 functions as an effective sealing element and eliminates the necessity of lubricating the valve. The invention does not reside in the use of resilient liner 14 but rather in the concept of solving a problem encountered in the utilization of such a resilient liner. Valve plug 13 is in the form of a truncated cone having a passage 15 therethrough. The inlet end of passage 15 comprises two or more openings 16 and 16A having a web 17 therebetween as shown in FIGURE 2. The outlet end of passage 15 is in the form of a narrow slot 18, as shown in FIGURE 3. Inlet openings 16 and 16A are of generally conical shape and merge into slot 18 to provide a continuous passageway. Valve plug 13 is provided with operating extension 19 to permit rotation of valve plug 13.

In FIGURE 4 there is shown a valve plug 23, which is also suitable for use in the invention. Valve plug 23 is in the form of a truncated cone having a passage 25 therethrough. Passage 25 is conical shaped with inlet opening 26 being larger than outlet opening 28, as shown in FIGURE 5.

The conventional Teflon-lined tapered plug valve has symmetrical upstream and downstream ports. Thus, both the upstream port and the downstream port are closed at the same rate and at the same time. When the valve is partially open the differential between upstream pressure and downstream pressure causes forces to act upon the unsupported portion of the Teflon liner around the upstream port, causing deflection and cold flow of the liner, and resulting eventually in tearing parts of the Teflon liner away from the valve body, thus causing failure of the valve.

In the apparatus of the present invention, this problem is overcome by employing an enlarged upstream port and a narrower downstream port so that the pressure drop occurs primarily at the downstream port and/or by dividing the upstream port into two or more openings with a web therebetween to give mechanical support to the resilient liner.

In FIGURES 6, 7, and 8 there are shown plan views in section of a valve in different operating positions. Valve 30 has an inlet conduit 31, outlet conduit 32, valve plug 33, resilient liner 34, and passage 35 with inlet port 36 and outlet port 38. Valve plug 33 can be either the valve plug of FIGURES 1, 2, and 3 or the valve plug of FIGURES 4 and 5. In FIGURE 6, the valve 30 is shown in fully open position. In FIGURE 7, the valve plug 33 has been rotated counter-clockwise from the position of FIGURE 6 until outlet 38 is fully closed. However, inlet port 36 is still partially opened. In FIGURE 8 the valve plug 33 has been further rotated counter-clockwise until both inlet port 36 and outlet port 38 are closed. The degree of rotation beyond that shown in FIGURE 7 is a matter of choice, depending upon the circumstances. However, sufficient overlapping surface between the liner and the plug must be provided to effect a seal.

As readily seen from FIGURE 7, the outlet port is closed at a time when the inlet port is still partially opened. Thus, the pressure drop occurs primarily at the outlet port. This eliminates or substantially reduces the action of pressure differential forces upon the unsupported portion 40 of the liner 34 as shown in FIGURE 7.

As readily seen from FIGURE 6, in a valve wherein it is desired to have a maximum of flow area in a given size valve body and plug, the downstream port 38 of plug 33 can be the same size as the downstream opening in the valve body and the upstream port 36 of plug 33 can be larger than the upstream opening in the valve body, thus causing the primary pressure drop to occur in the downstream seat as the valve closes. If desired, the upstream port of the valve plug can be unsymmetrical as a means of providing sufficient solid portion of the valve plug to seal the downstream opening in the valve body. This provides for maximum flow area while permitting the downstream port to close before the upstream port to prevent damage to the liner near the upstream port. It is apparent that a supporting web could be used in conjunction with the foregoing combination.

The following example will serve to illustrate the advantages of the invention and should not be construed to limit the invention unduly.

In a system to remove product from a catalytic reactor in which olefins are polymerized directly to the solid state while being held in suspension in a hydrocarbon diluent, the solid product is permitted to settle into a chamber from which it is removed through a valve to a drying chamber. When the valve is opened, reactor pressure, which is approximately 450 p.s.i. above the dryer pressure, forces the product through the valve to the dryer. The original 1½ inch plug valve, its plug equipped with a straight through ⅜ inch by 1¼ inch slot, failed in approximately seven days or 14,000 cycles. When the valve was disassembled, it was found that the plug liner was ruptured in the area of the upstream port.

The standard valve was replaced by a valve modified according to this invention to have a plug opening of ⅞ inch diameter tapered to a ⅜ by 1¼ inch slot. This valve operated in excess of 46 days or 80,000 cycles and when disassembled, the Teflon sleeve showed no undue wear and the valve was providing an adequate seal.

Reasonable variation and modification are possible within the scope of the foregoing disclosure, the drawing, and the appended claim to the invention, the essence of which is that failure of the resilient liner in a plug valve can be substantially reduced or eliminated by enlarging the upstream port of the valve and/or dividing the upstream port of the valve into two or more openings so that a supporting web exists therebetween.

We claim:

A valve structure comprising, in combination, a valve housing defining a valve chamber, inlet means and outlet means communicating with said chamber, a lining means in intimate contact with said valve chamber, a valve element rotatably mounted in said valve chamber in engagement with said lining means, said valve element having a passage therethrough defined by an inlet port and an outlet port in communicating respectively with said inlet means and said outlet means, said inlet port having a greater width than said outlet port, said inlet port comprising a plurality of openings with at least two of said openings lying in the plane of the axis of said valve element, thereby providing a mechanical support for said lining means and the area of the openings of said inlet port being greater than the area of the opening of said inlet means.

References Cited in the file of this patent
UNITED STATES PATENTS

| | | |
|---|---|---|
| 859,236 | Maier | July 9, 1907 |
| 2,987,295 | Schenck | June 6, 1961 |